US012476371B2

(12) United States Patent
Starck et al.

(10) Patent No.: US 12,476,371 B2
(45) Date of Patent: Nov. 18, 2025

(54) ANTENNA, AND CIRCUIT BOARD HAVING AN ANTENNA

(71) Applicant: ABRACON, LLC, Spicewood, TX (US)

(72) Inventors: Jonas O. Starck, Umea (SE); Johan M. Vall, Umea (SE); William M. Eriksson Selin, Umea (SE); C. Jonatan Lindahl, Vannas (SE); Viktor A. Lundström, Umea (SE); Ossian T. T. O. Kynman, Umea (SE)

(73) Assignee: Abracon, LLC, Spicewood, TX (US)

( * ) Notice: Subject to any disclaimer, the term of this patent is extended or adjusted under 35 U.S.C. 154(b) by 133 days.

(21) Appl. No.: 18/415,939

(22) Filed: Jan. 18, 2024

(65) Prior Publication Data

US 2025/0239770 A1 Jul. 24, 2025

(51) Int. Cl.
*H01Q 1/22* (2006.01)
*H01Q 9/04* (2006.01)

(52) U.S. Cl.
CPC ............. *H01Q 9/0407* (2013.01); *H01Q 1/22* (2013.01)

(58) Field of Classification Search
CPC .. H01Q 1/22; H01Q 1/32; H01Q 1/24; H01Q 9/0407; H01Q 1/38–48; H01Q 1/52; H01Q 5/30–35
See application file for complete search history.

(56) References Cited

U.S. PATENT DOCUMENTS 6,967,624 B1 * 11/2005 Hsu ........................ H01Q 13/10 343/770
10,910,715 B2 2/2021 Rutfors
11,289,809 B2 * 3/2022 Adela ...................... H01Q 9/26

* cited by examiner

*Primary Examiner* — Hasan Islam
(74) *Attorney, Agent, or Firm* — Dickinson Wright PLLC

(57) ABSTRACT

Antenna, and circuit board having an antenna. One example is an antenna comprising: a sheet of metallic material; a notch in the sheet of metallic material, the notch is triangular; a first exterior standoff that extends from a first edge of the notch, the first exterior standoff has a solder surface that defines an offset plane; a second exterior standoff that extends from the second edge of the notch, the second exterior standoff has a solder surface that resides in the offset plane; a first feed spacer extending into the notch; a first crossover spacer that extends from into the notch; and a second crossover spacer that extends into the notch, the second crossover spacer has a baseplate that resides in the offset plane.

30 Claims, 7 Drawing Sheets

ANTENNA, AND CIRCUIT BOARD HAVING AN ANTENNA

CROSS-REFERENCE TO RELATED APPLICATIONS

Not Applicable.

BACKGROUND

Many electronic devices wirelessly communicate with other devices using any one of a plurality of different wireless communication protocols. Example protocols include any of the many protocols defined by the Institute of Electrical and Electronic Engineers (IEEE) 802.11 family of protocols, such as IEEE 802.11be (sometimes referred to as WiFi7), IEEE 802.11ax (sometimes referred to as WiFi6E or WiFi6), and IEEE 802.15.4a (sometimes referred to as ultra-wide band (UWB)). The example WiFi7 and WiFi6 may operate at any of a plurality of frequencies, and in some cases simultaneously operate in the plurality of frequencies. For example, WiFi7 may operate at 2.4 GigaHertz (GHz), 5 GHZ, and/or 6 GHz.

Antenna design at these frequencies may be affected by factors outside the physical dimensions of the antenna, such as antenna placement on the underlying circuit board, and proximity of other electrical components to the antenna. Thus, any system, method, or antenna design that shortens the design process and provides predictability in the ultimate performance of the antennas would provide a competitive advantage in the marketplace.

SUMMARY

One example is an antenna comprising: a sheet of metallic material that defines an outer surface, a top edge, a first edge that intersects the top edge, and a second edge that intersects the top edge, the outer surface defines and resides in a main plane; a notch in the sheet of metallic material, the notch is triangular and defines a base, a first leg that intersect the base, a second leg that intersects the base, and an apex region open on the top edge of the sheet of metallic material; a first exterior standoff that extends from the first edge, the first exterior standoff has a solder surface that defines an offset plane, the offset plane having non-zero offset from the main plane; a second exterior standoff that extends from the second edge, the second exterior standoff has a solder surface that resides in the offset plane; a first feed spacer extending into the notch, the first feed spacer has a baseplate that resides in the offset plane; a first crossover spacer that extends from the first leg into the notch, the first crossover spacer has a baseplate that resides in the offset plane; and a second crossover spacer that extends from the second leg into the notch opposite the first crossover spacer, the second crossover spacer has a baseplate that resides in the offset plane.

The example antenna may further comprise a spine proximate to the base of the notch, the spine extends toward the offset plane. The spine may define a spine plane perpendicular to the main plane. In one example, the distal end of the spine plane does not intersect the offset plane. The spine may extend from the base or a bottom edge of the sheet of metallic material, the bottom edge opposite the top edge. The spine may extend from a bottom edge of the sheet of metallic material, and the spine defines a solder surface that resides in the offset plane. The spine may define two solder surfaces disposed at opposite ends of the spine.

The example antenna may further comprise: a first interior standoff that extends from the first leg into the notch, the first interior standoff defines a baseplate that resides in the offset plane; and a second interior standoff that extends from the second leg into the notch, the second interior standoff defines a baseplate that resides in the offset plane. The baseplate of the first interior standoff may protrude toward the first edge. The baseplate of the second interior standoff may protrude toward the second edge.

In the example antenna, the offset between the main plane and the offset plane may be between 0.3 millimeters (mm) to 1.5 mm, inclusive.

In the example antenna, the offset between the main plane and the offset plane may be about between 0.3 mm millimeters and 1.0 mm, inclusive.

In the example antenna, the solder surface of the first exterior standoff may comprise two solder feet spaced apart from each other along the first edge. The solder surface of the second exterior standoff may comprises two solder feet spaced apart from each other along the second edge.

The example antenna may further comprise a second feed spacer extending from the second leg of the notch opposite the first feed spacer, the second feed spacer has a baseplate that resides in the offset plane.

Yet another example is a circuit board comprising: a board edge defined by the circuit board; a metallic ground plane defined on or within the circuit board; a recess within the metallic ground plane, the recess defines an interior periphery and an opening to the board edge; a feed line that extends into the recess; and an antenna coupled to the circuit board. The antenna may comprise: a sheet of metallic material that defines an outer surface, a top edge, a first edge that intersects the top edge, and a second edge that intersects the top edge, the outer surface defines and resides in a main plane and having an offset from the circuit board that is non-zero; a notch in the sheet of metallic material, the notch residing at least partially over the recess, the notch is triangular and defines a base, a first leg that intersect the base, a second leg that intersects the base, and an apex region that opens to the board edge; a first exterior standoff that extends from the first edge and is electrically coupled to the metallic ground plane; a second exterior standoff that extends from the second edge and is electrically coupled to the metallic ground plane; a first feed spacer that extends from the first leg of the notch and is electrically coupled to the feed line by way of a reactive network; a first crossover spacer that extends into the notch and is electrically coupled to the metallic ground plane on a first side of the opening; a second crossover spacer that extends into the notch, the second crossover spacer is electrically coupled to the metallic ground plane on a second side of the opening; and a first reactive network disposed within the recess, the first reactive network electrically coupled between the first crossover spacer to the second crossover spacer.

In the example circuit board, the antenna may further comprise a spine proximate to the base of the notch, the spine extends toward the circuit board. The spine ay define a spine plane perpendicular to the main plane. In one example, the distal end of the spine plane does not intersect the circuit board. The spine may extend from the base or a bottom edge of the main sheet, the bottom edge opposite the top edge. The spine extends from a bottom side of the main sheet, and the spine defines a solder surface electrically coupled to the metallic ground plane. The spine may define two solder surfaces disposed at opposite ends of the spine, each solder surface electrically coupled to the metallic ground plane.

In the example circuit board, the antenna may further comprise: a first interior standoff that extends from the first leg into the notch, the first interior standoff defines a baseplate coupled to the circuit board; and a second interior standoff that extends from the second leg into the notch, the second interior standoff defines a baseplate that coupled to the circuit board. The baseplate of the first interior standoff may protrudes toward the first edge. The baseplate of the second interior standoff may protrude toward the second edge.

In the example circuit board, the offset between the main plane and circuit board may be between and including 0.3 millimeters (mm) to 1.5 mm, inclusive.

In the example circuit board, the offset between the main plane and the circuit board may be between 0.3 millimeters (mm) and 1.0 mm, inclusive.

In the example circuit board, a solder surface of the first exterior standoff may comprise two solder feet spaced apart from each other along the first edge. The solder surface of the second exterior standoff may comprise two solder feet spaced apart from each other along the second edge.

In the example circuit board, the antenna may further comprise a second feed spacer extending from the second leg of the notch opposite the first feed spacer, the second feed spacer has a baseplate that abuts the circuit board within the recess.

BRIEF DESCRIPTION OF THE DRAWINGS

For a detailed description of example embodiments, reference will now be made to the accompanying drawings in which.

DEFINITIONS

Figure 1:
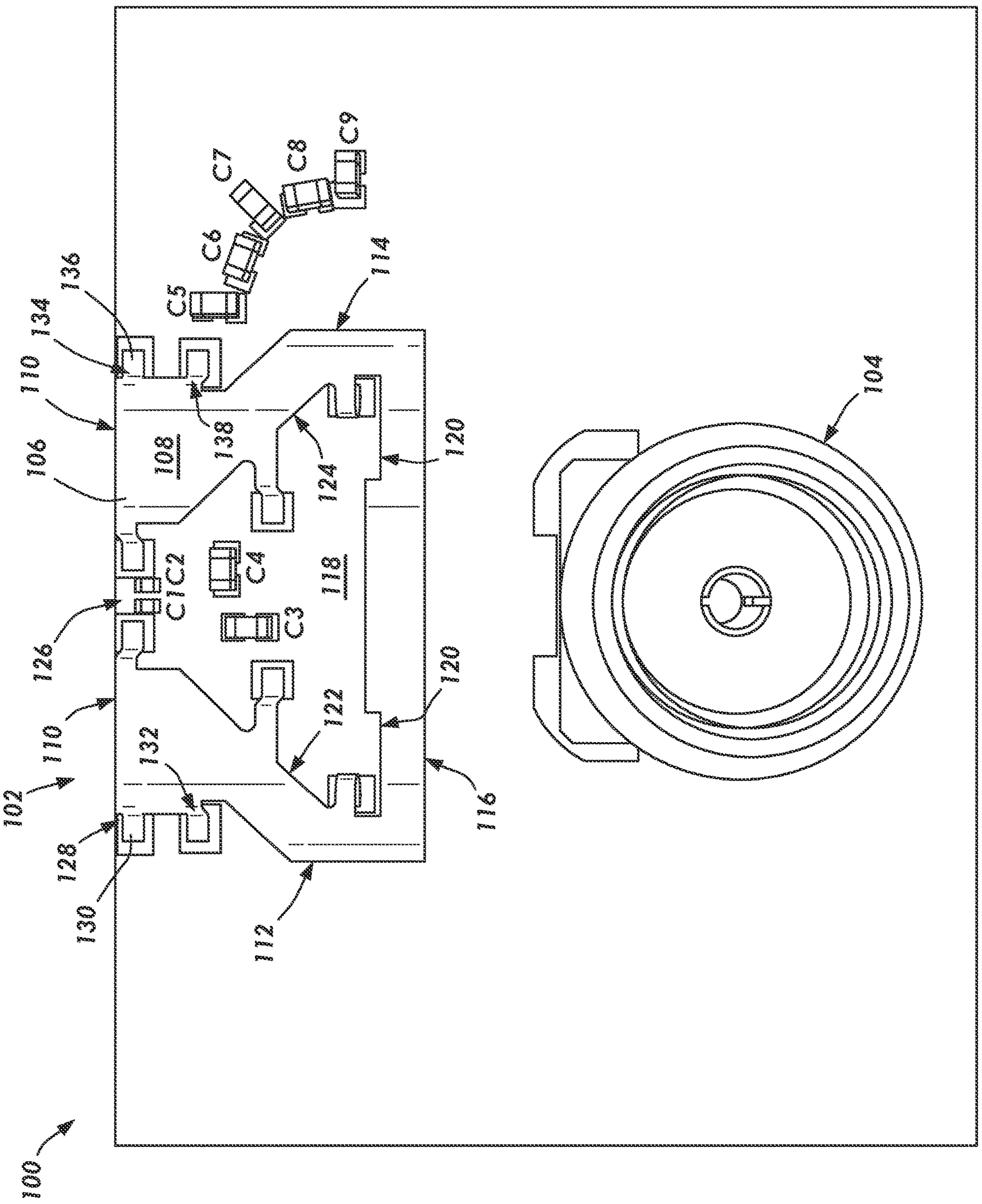
FIG. 1 shows an overhead perspective view of a circuit board and attached antenna, in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate the fact the recited referent may be plural.

"Controller" shall mean, alone or in combination, individual circuit components, an application specific integrated circuit (ASIC), a microcontroller with controlling software, a reduced-instruction-set computer (RISC) with controlling software, a digital signal processor (DSP), a processor with controlling software, a programmable logic device (PLD), a field programmable gate array (FPGA), or a programmable system-on-a-chip (PSOC), configured to read inputs and drive outputs responsive to the inputs.

Locational words like "top" and "bottom" are meant only to distinguish referents, and not to imply any location with respect to gravity.

"Triangular" in reference to a notch shall mean that the notch has features that, taken as whole, represent a triangle. The triangle formed, however, need not be complete. Apex regions, standoffs that protrude into to the notch, and feed spacers that extend into the notch shall not obviate that a notch is "triangular."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to single-, dual-, or triple-frequency WiFi antennas for wireless communication, and circuit boards hosting such antennas. More particularly still, various examples are directed to antennas designed for attachment to underlying circuit boards using surface mount technology (SMT). The antennas are designed and constructed such that, when mechanically and electrically coupled to the circuit board, the antennas are offset from the underlying circuit board and likewise offset from the metallic ground plane defined by the circuit board. The example antennas each have a notch region defining a triangular shape with an apex region open on a top edge of antenna. The specification first turns to an example circuit board and attached antenna to orient the reader.

FIG. 1 shows an overhead perspective view of an example circuit board and attached antenna. In particular, FIG. 1 shows an example circuit board 100. Mounted on the visible surface of the circuit board are an example antenna 102 and a coaxial connector 104. The example circuit board 100 is an evaluation board that may be used by customers to evaluate various antennas, such as antenna 102. However, in mass production runs, the circuit board 100 may be any electronic device that communicates wirelessly, such as mobile computer devices, Internet of Things (IoT) devices, and wearable devices, to name a few, and thus may omit the coaxial connector 104.

The example antenna 102 is a sheet of metallic material 106 that defines an outer surface 108. In some examples, the metallic material is a metal alloy, such as Nickel-Silver (e.g., C7521). In other cases, the metallic material may be copper, brass, aluminum, or any other suitable metal and/or alloy.

The example antenna 102 defines a top edge 110, a left edge 112 that intersects the top edge 110, a right edge 114 that intersects the top edge 110, and a bottom edge 116. The adjectives top, left, right, and bottom are arbitrarily assigned based on the view of FIG. 1, and shall not be read as requiring any particular position or orientation with respect the gravity. For example, the top edge 110 may alternatively and equivalently referred to as an outer edge. The bottom edge may alternatively and equivalently referred to as an inner edge.

Still referring to FIG. 1, the example antenna 102 defines an interior region devoid of metallic material, the interior region referred to as triangular notch 118. The example triangular notch 118 defines a base 120, a leg 122 that intersect the base 120, a right leg 124 that intersects the base, and an apex region 126 open on the top edge 110 of the sheet of metallic material 106. That is to say, while the legs 122 and 124 extend toward each other, the legs 122 and 124 do not fully converge, and instead the legs 122 and 124 form the apex region 126 open on the top edge 110. Moreover, various structures, discussed more below, intersect or extend from the base and the legs; however, those structures shall not obviate that the triangular notch 118 is triangular.

The example antenna 102 further includes an exterior standoff 128 that extends from the left edge 112. The example exterior standoff 128 includes a solder surface 130, illustratively shown as a solder pad or solder foot. In the example antenna, the outer surface 108 of the sheet of metallic material 106 defines and resides in a plane, referred to herein as the main plane. The visible surface of the circuit board 100 defines and resides in another plane, and the main plane of the example antenna 102 has a non-zero offset from the plane defined by the visible surface of the circuit board 100. As discussed in greater detail below, the offset between the outer surface 108 or main plane and the plane of the circuit board (sometimes referred to as the offset plane) may be between 0.3 millimeters (mm) to 1.5 mm, inclusive. The example exterior standoff 128 thus provides a structural offset between the bottom side of solder surface 130 and the outer surface 108 of the antenna 102. The example antenna 102 further includes an exterior standoff 132 similarly disposed on the left edge 112 and spaced apart from the exterior standoff 128. Other than its location, the exterior standoff 132 has similar structural components to the exterior standoff 128, and thus the description is duplicative and will not be repeated so as not to unduly lengthen the specification.

Still referring to FIG. 1, the example antenna 102 further includes an exterior standoff 134 that extends from the right edge 114. The example exterior standoff 134 includes a solder surface 136, illustratively shown as a solder pad or solder foot. The example exterior standoff 134 likewise provides a structural offset between the bottom side of the solder surface 136 and the outer surface 108 of the antenna 102. The example antenna 102 further includes an exterior standoff 138 similarly disposed on the right edge 114 and spaced apart from the exterior standoff 134. Other than its location, the exterior standoff 138 has similar structural components to the exterior standoff 134, and thus the description is duplicative and will not be repeated so as not to unduly lengthen the specification.

Figure 2:
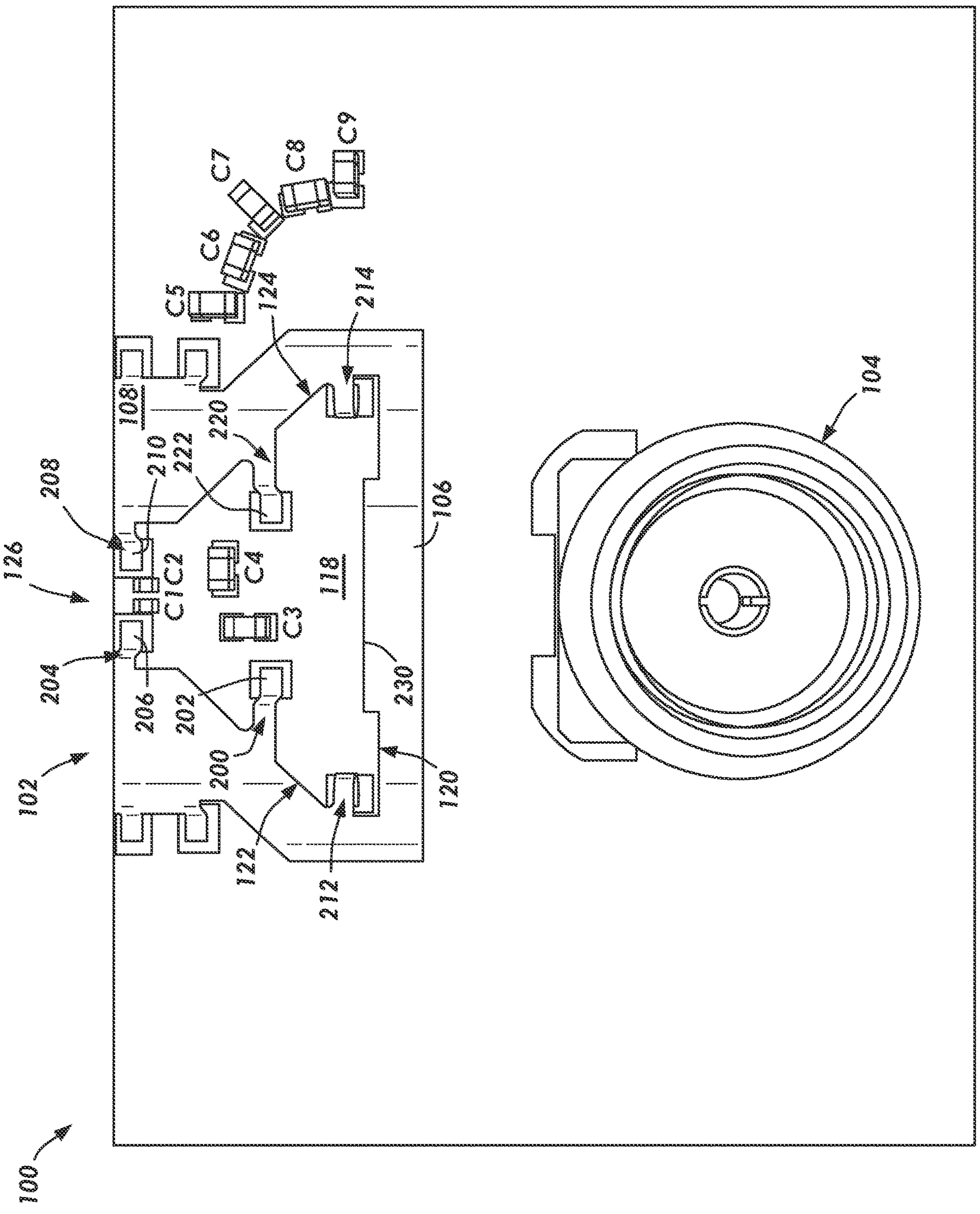
FIG. 2 shows an overhead perspective view of a circuit board and attached antenna, in accordance with at least some embodiments.

FIG. 2 shows an overhead perspective view of an example circuit board and attached antenna. The underlying drawing of FIG. 2 is identical to FIG. 1, but is presented again to highlight structures within the triangular notch 118. In particular, example antenna 102 defines a feed spacer 200. The example feed spacer 200 extends from the leg 122 of the triangular notch 118 and into the region of the triangular notch 118. The feed spacer 200 has a baseplate 202, illustratively shown as a solder pad or solder foot. The baseplate 202 may form a solder surface, similar to the solder surface 130 of FIG. 1, but different terminology is used for structures inside the triangular notch 118 as compared to outside the triangular notch 118 to help differentiate the components. Thus, the example feed spacer 200 provides a structural offset between the bottom side of the baseplate 202 and the outer surface 108 of the antenna 102. The feed spacer 200 may be the main injection point for voltage and current when transmitting from the antenna 102, and likewise may be the main extraction point for voltage and current when receiving by the antenna 102. In the example circuit board 100, the center pin of the coaxial connector 104 is electrically coupled to the feed spacer 200 by way of a set of reactive components. Some of the reactive components may be used to tune the antenna 102 (e.g., capacitors C3 and C4). The other reactive components may be designed and constructed to be an impedance matching network (e.g., capacitors C5, C6, C7, C8 and C9) that electrically couples the feed spacer 200 to the center pin of the coaxial connector 104. While seven capacitors are shown in the example reactive components, any suitable number of reactive elements may be used to turning and/or impedance matching purposes.

Further defined within the triangular notch 118 is a crossover spacer 204 that extends from the left leg 122 into the apex region 126. The crossover spacer 204 has a baseplate 206 that abuts or resides in the offset plane defined by the circuit board 100. The example antenna 102 further includes another crossover spacer 208 that extends from the right leg 124 into the apex region 126, the crossover spacer 208 opposite the crossover spacer 204. The crossover spacer 208 has a baseplate that abuts or resides in the offset plane defined by the circuit board 100. In example implementations, the baseplates 206 and 210 are mechanically and electrically coupled to the ground plane of the circuit board, though the ground plane not visible in FIG. 2. Moreover, in example implementations the crossover spacers 204 and 208 are electrically coupled to each other by way of a reactive network, the reactive network illustratively including capacitors C1 and C2.

Still referring to FIG. 2, the example antenna 102 further includes a set of interior standoffs 212 and 214. The interior standoff 212 extends from the leg 122 into the triangular notch 118. The interior standoff 212 defines a baseplate that abuts or resides in the offset plane defined by the circuit board 100; however, the example baseplate for the interior standoff 212 protrudes toward the left edge 112 of the sheet of metallic material 106, and is thus difficult to see in FIG. 2. Similarly, the interior standoff 214 extends from the leg 124 into the triangular notch 118. The interior standoff 214 defines a baseplate that abuts or resides in the offset plane defined by the circuit board 100; however again, the example baseplate for the interior standoff 214 protrudes toward the right edge 114 of the sheet of metallic material 106, and is thus difficult to see in FIG. 2.

In some implementations, the interior standoffs 212 and 214 are mechanically and electrically coupled to the ground plane of the circuit board 100. In such implementations, the interior standoffs 212 and 214 not only provide mechanical support for the antenna 102, but also electrically couple to the underlying ground plane. In other cases, the interior standoffs 212 and 214 may be mechanically coupled to the circuit board 100 (e.g., soldered), but the circuit board 100 may omit the electrical coupling of the solder pads to the ground plane. In other words, the circuit board 100 may define solder pads for baseplates of the interior standoffs 212 and 214, but those solder pads may not electrically couple to the ground plane through the circuit board. Further still, for antenna designs that do not need the antenna 102 supported or grounded at the location of the interior standoffs 212 and 214, one or both interior standoffs 212 and 214 may be omitted.

The example antenna 102 further includes another feed spacer 220. The feed spacer 220 extends from the leg 124 into the triangular notch 118. The feed spacer 220 extends into the triangular notch 118 at a location opposite the feed spacer 200. The feed spacer 220 has a baseplate 222, illustratively shown as a solder pad or solder foot. The baseplate 222 may form a solder surface. Thus, the example feed spacer 220 provides a structural offset between the baseplate 222 and the outer surface 108 of the antenna 102. The feed spacer 220 may be, additionally or alternatively, the main injection point for voltage and current when transmitting from the example antenna 102, and likewise may be, additionally or alternatively, the main extraction point for voltage and current when receiving by the example antenna 102. In the example arrangement of FIG. 2, the antenna 102 is fed by way of the feed spacer 200 on the left, and thus the feed spacer 220 may be omitted. Alternatively, the antenna 102 may be fed by way of the feed spacer 220 on the right, in such circumstances the antenna 102 may omit the feed spacer 200.

Still referring to FIG. 2, in some cases the antenna 102 may include a spine 230 proximate to the base 120 of the triangular notch 118. The spine 230 may be a contiguous piece of the sheet of metallic material 106, but where the spine 230 is bent to protrude away from the outer surface 108. In the example of FIG. 2, the spine 230 extends toward the circuit board 100, but in other cases the spine 230 may extend away from the circuit board. The example spine 230 stiffens the sheet of metallic material along the base 120. Though not visible in FIG. 2, the example spine 230 does not contact the circuit board 100. However, in other cases discussed below, the spine 230 may extend to the offset plane defined by the circuit board 100.

Figure 3:
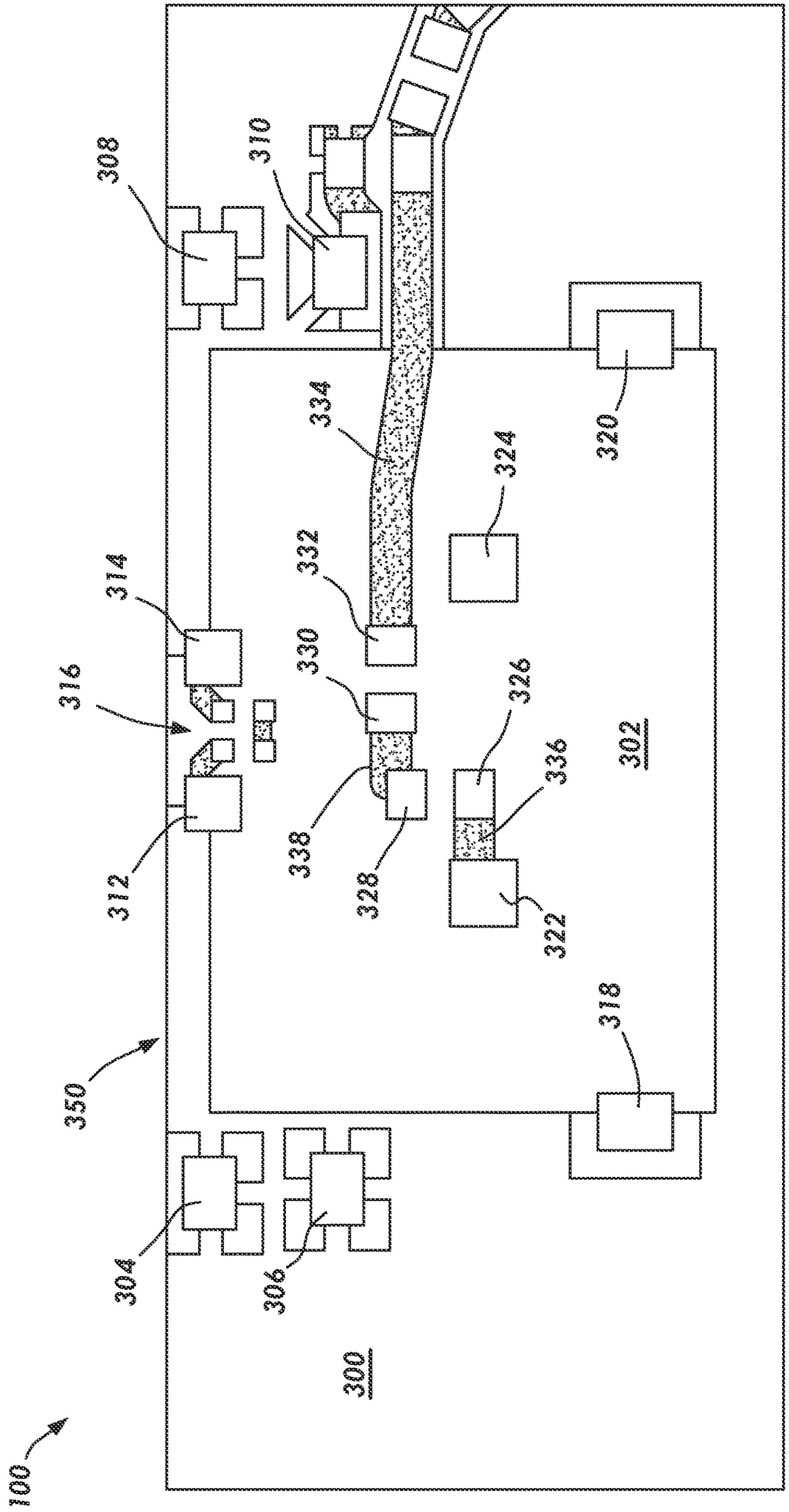
FIG. 3 shows an overhead view of a portion of the circuit board with the ground plane visible, and in accordance with at least some embodiments.

FIG. 3 shows an overhead view of a portion of the circuit board 100 with the ground plane visible and the antenna 102 removed. In particular, FIG. 3 shows a portion of the circuit board 100 with the protective outer coating removed to expose the ground plane 300 (shown in crosshatch). That is, the circuit board 100 is a layered component, and one such layer includes metallic material to be the ground plane 300. The example ground plane 300 defines a recess 302, the recess 302 defined by an area that omits the metallic material of the ground plane 300 or where the metallic material has been etched away during construction of the circuit board 100. The recess 302 defines an interior periphery that is illustratively shown as a rectangular, but any suitable shape of the recess 302 may be used depending on the size and shape of the antenna. The recess 302 is selected to be larger in area that an area of the triangular notch 118 of an antenna to be used. Stated otherwise, the triangular notch 118 of an antenna resides above the recess 302 such that the ground plane does not extend into the area of the triangular notch 118 if the area of triangular notch is projected into the plane of the circuit board 100.

In order to at least mechanically couple the antenna 102 to the circuit board 100, the circuit board 100 may define a plurality of solder pads. For example, solder pads 304 and 306 are located for soldering to the solder surfaces of exterior standoffs 128 and 132 (FIG. 1), respectively. Solder pads 308 and 310 are located for soldering the solder surfaces of exterior standoffs 134 and 138 (FIG. 1), respectively. Solder pads 312 and 314 are located for soldering the baseplates of the crossover spacers 204 and 208 (FIG. 2), respectively. Notice how the ground plane 300 extends along a top edge 350 of the circuit board 100 to reside beneath the solder pads 312 and 314, but that the ground plane 300 defines a notch 316 open to the top edge 350 and into the recess 302. Solder pads 318 and 320 are located for soldering the baseplates of interior standoffs 212 and 214 (FIG. 2), respectively. In the example of FIG. 3, all the solder pads noted to this point (i.e., solder pads 304, 306, 308, 310, 312, 314, 318, and 320) are electrically coupled to the ground plane 300. Thus, when the antenna 102 is mechanically and electrically coupled to the circuit board 100 by soldering, all those connections are electrical connections to the ground plane 300. Again, however, in other cases the solder pads 318 and 320 may omit the electrical connection to the underlying ground plane 300.

Still referring to FIG. 3, the example circuit board 100 further defines solder pads 322 and 324. The solder pads 322 and 324 are located for soldering to the baseplates of the feed spacers 200 and 220 (FIG. 2), respectively. In the example layout of the ground plane 300 of FIG. 3, the antenna feed is solely through the solder pad 322. Thus, solder pad 322 is electrically coupled to a reactive feed network formed by capacitors C3 and C4 (FIG. 2). In particular, capacitor C3 may couple across solder pad 326 and 328. Capacitor C4 may couple across solder pads 330 and 332. Solder pad 332 may couple to solder pads outside the recess 302 by a feed line shown by metallic connection 334. The metallic connection 334 may be a metal layer embedded within the circuit board 100 "above" or "below" the ground plane 300 in the layers of the circuit board 100. Similarly, the metallic connections 336 and 338 electrically couple to the respective solder pads.

In the example of FIG. 3, the feed spacer 220 on the right is not electrically connected. Thus, the solder pad 324 is not electrically connected to the ground plane 300 or the feed network feeding the solder pad 322. It follows, the feed spacer 220 will be soldered to the solder pad 324, but that connection will provide only mechanical support in the example arrangement.

Figure 4A:
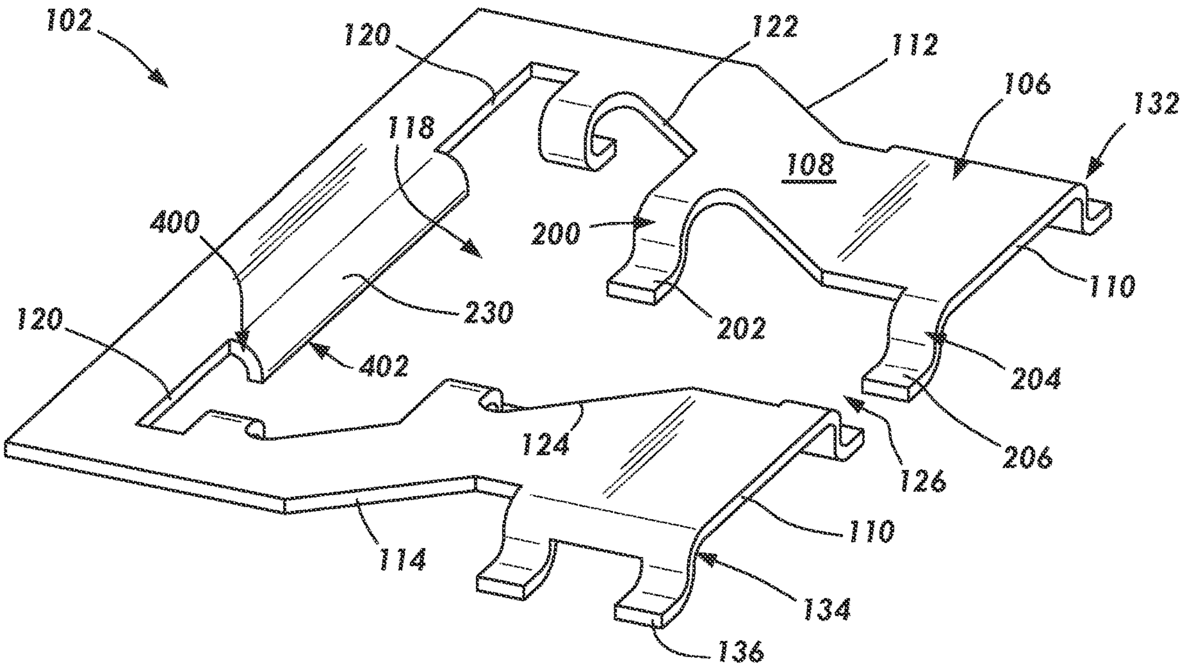
FIG. 4A shows a top perspective view of an antenna in accordance with at least some embodiments.

FIG. 4A shows a top perspective view of the example antenna 102. In particular, visible in FIG. 4A is the sheet of metallic material 106 defining the outer surface 108. Following the prior terminology, the sheet of metallic material 106 defines the top edge 110, the left edge 112 that intersects the top edge 110, and a right edge 114 that intersects the top edge 110. The outer surface 108 defines and resides in the main plane. The antenna 102 includes the triangular notch 118. The triangular notch 118 defines the base 120, the leg 122 that intersect the base 120, the leg 124 that intersects the base 120, and the apex region 126 open on the top edge 110. The exterior standoff 132 is partially hidden in FIG. 4A; however, the exterior standoff 134 is better visible. The example exterior standoff 134 extends from the right edge 114, and the exterior standoff 134 defines the solder surface

136. The solder surface 136 abuts or resides in the offset plane, and the offset plane has non-zero offset from the main plane. Further, better visible in FIG. 4A is the feed spacer 200 and its baseplate 202 that abuts or resides in the offset plane. Similarly, better visible is the example crossover spacer 204 and its baseplate 206 that abuts or resides in the offset plane.

The view of FIG. 4A also better shows the spine 230. The example spine 230 is disposed proximate to the base 120. The example spine 230 has a curved region 400 closer to the base 120, and then a planar region 402 that defines a spine plane perpendicular to the main plane defined by the outer surface 108. As partially visible in FIG. 4A, in some cases the spine 230 does not extend all the way to the offset plane.

Figure 4B:
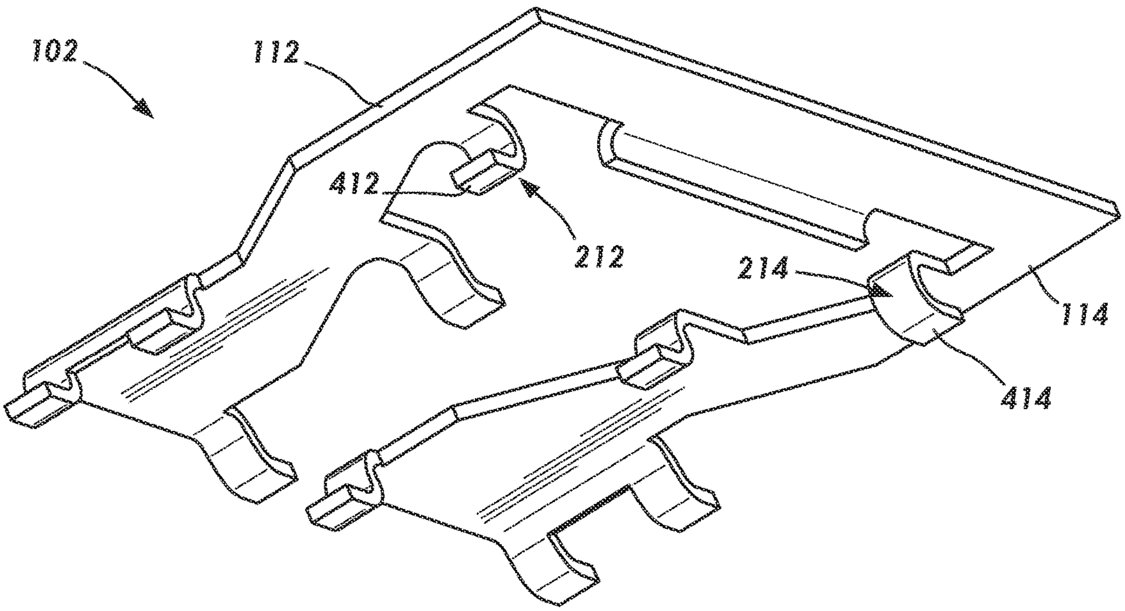
FIG. 4B shows a bottom perspective view of the antenna of FIG. 4A, in accordance with at least some embodiments.

FIG. 4B shows a bottom perspective view of the example antenna 102. Notice how, for the example standoff 212, the baseplate 412 protrudes toward the left edge 112. Similarly, for the example standoff 214 the baseplate 414 protrudes toward the right edge 114. In other cases, however, the baseplates for the interior standoffs may protrude the opposite direction (i.e., into the triangular notch).

Figure 5:
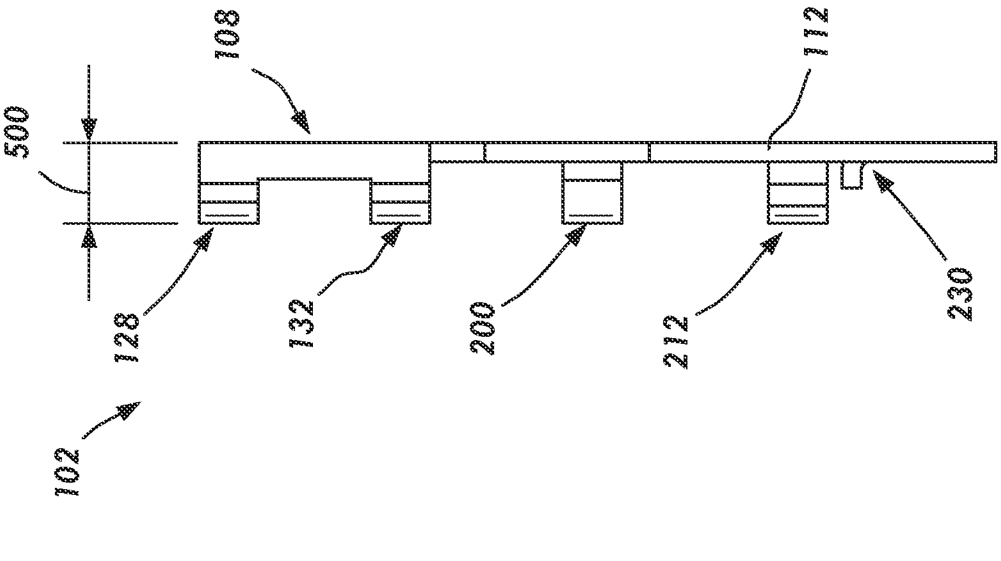
FIG. 5 shows a side elevation view of an antenna in accordance with at least some embodiments.

FIG. 5 shows a side elevation view of the example antenna 102. In particular, the view of FIG. 5 is looking toward the left edge 112. Visible in FIG. 5 are the exterior standoffs 128 and 132, the feed spacer 200, the interior standoff 212, and the spine 230. FIG. 5 shows the offset 500 between the main plane, defined by the outer surface 108, and the offset plane defined here by the lower side of the solder surfaces of the exterior standoffs 128 and 132. Or equivalently stated, FIG. 5 shows the offset between the main plane, defined by the outer surface 108, and the offset plane defined by lower surfaces of the baseplates of the feed spacers and/or interior standoffs. In some examples, the offset between the main plane and the offset plane is between and including 0.3 mm to 1.5 mm, in some cases between and including 0.3 mm and 1.0 mm, in a particular case about 0.72 mm.

Having the antenna 102 offset from the circuit board 100 may increase the efficiency of the antenna 102. Stated otherwise, having the antenna 102 offset from the ground plane 300 of the circuit board 100 may increase the efficiency of the antenna 102. The increase in efficiency may take many forms. For example, the offset 500 may increase the bandwidth of the antenna 102, compared to an antenna formed directly in the ground plane of the circuit board 100. The offset 500 may advantageously change the transmission/reception pattern of the antenna 102, compared to an antenna created or formed directly in the ground plane of the circuit board 100. As yet another example, the offset 500 may make the antenna 102 less susceptible to parasitic changes in resonant frequency and/or transmission/reception patterns caused by other electrical components disposed on the circuit board 100 near the antenna 102.

Returning to FIG. 4A, in at least some examples the antenna 102 may be created by a metal stamping process. For example, a planar sheet of metallic material may be stamped to cut out the flat outline of the antenna 102. The stamped component may then have various features bent to create the standoffs, spacers, and feed spacer(s). In some cases, the stamping simultaneously cuts the outer shape of the antenna and provides at least some of the bends to form the standoffs and spacers. For example, the stamping may cut the metallic material and create the bends to arrange the exterior standoffs 128, 132, 134, and 138, create the bends for the feed spacer(s), create the bends for the crossover spacers, and at least partially create the bends for the interior standoffs 212 and 214. In the example antenna where the baseplates for the interior standoffs 212 and 214 protrude away from each other and toward respective edges of antenna 102, a follow-on bending step may be used.

The antenna 102 shown and discussed to this point is an example of a WiFi7 antenna designed and constructed to operate at two or more resonant frequencies, such as at 2.4 GigaHertz (GHz), 5 GHZ, and 6 GHz. However, the principles of the various embodiments are not limited to WiFi7 antennas and/or more than one resonant frequency.

Figure 6A:
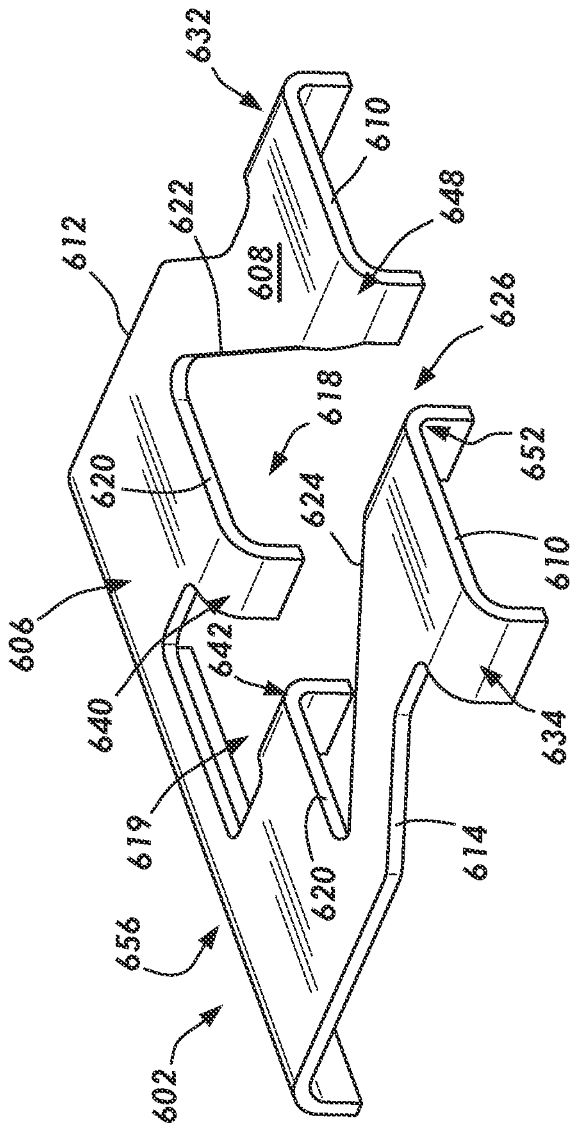
FIG. 6A shows a top perspective view of an alternate antenna.
Figure 6B:
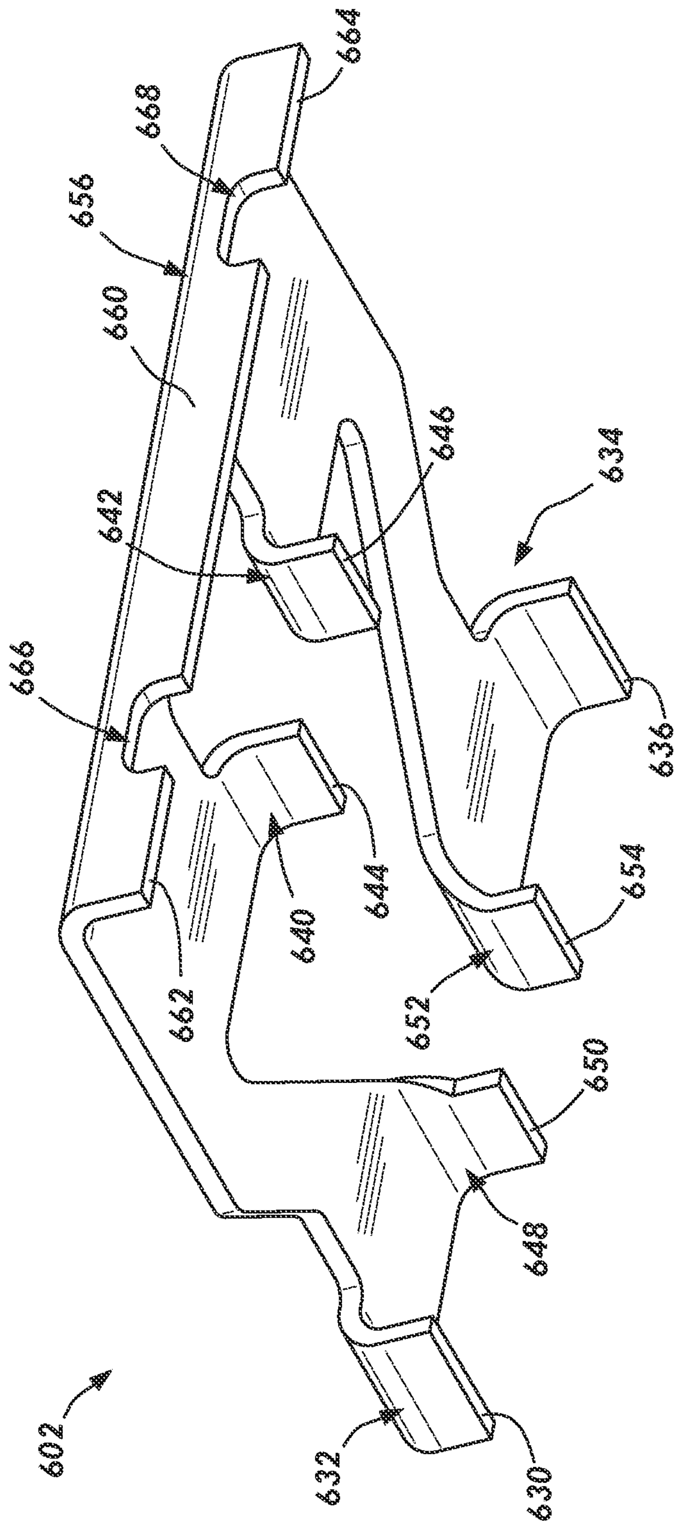
FIG. 6B shows a bottom perspective view of the alternate antenna, in accordance with at least some embodiments.

FIG. 6A shows a top perspective view of another example antenna 602, and FIG. 6B shows a bottom perspective view of the example antenna 602. Referring simultaneously to FIGS. 6A and 6B. The example antenna 602 comprises a sheet of metallic material 606 that defines a top edge 610, the left edge 612 that intersects the top edge 610, and a right edge 614 that intersects the top edge 610. The outer surface 608 defines and resides in a main plane. The antenna 602 includes the triangular notch 618. The triangular notch 618 defines a base 620, a leg 622 that intersect the base 620, a leg 624 that intersects the base 620, and an apex region 626 open on the top edge 110. The example antenna 602 further includes a rectangular notch 619 that bisects the base 620, and has a width smaller than a length of the base 620.

The example antenna 602 defines an exterior standoff 632 that extends from the left edge 112, and an exterior standoff 634 that extends from the right edge 614. The exterior standoff 632 defines a solder surface 630 at the bottom of the exterior standoff 632, and the exterior standoff 634 defines the solder surface 636 at the bottom of the exterior standoff 634. The solder surfaces 630 and 636 abut or reside in the offset plane, and the offset plane has non-zero offset from the main plane. Thus, the example antenna 602 has only one exterior standoff on each outer edge of the antenna, proximate to the top edge 610.

The example antenna 602 further includes a feed spacer 640 extending into the triangular notch 618, and a second feed spacer 642 extending into the triangular notch 618. The feed spacer 642 is disposed opposite the feed spacer 640. The feed spacer 640 defines a baseplate 644 that abuts or resides in the offset plane. Similarly, the feed spacer 642 defines a baseplate 646 that abuts or resides in the offset plane.

The example antenna 602 further includes a crossover spacer 648 that extends into the apex region 626, and the crossover spacer 648 has a baseplate 650 that abuts or resides in the offset plane. The example antenna 602 further includes a crossover spacer 652 that extends into the triangular notch 618, and the crossover spacer 652 has a baseplate 654 that abuts or resides in the offset plane. The crossover spacer 652 is disposed opposite the crossover spacer 648.

The example antenna 602 further includes a spine 656 proximate to the base 620, and in particular proximate to the rectangular notch 619. In the example antenna 602, the spine 656 defines the lower edge 658 of the sheet of metallic material 606. The example spine 656 defines a curved portion and a planar portion 660, where the planar portion 660 defines a plane that, in some cases, is perpendicular to the main plane defined by the outer surface 608. The example spine 656 extends to the offset plane. Further, the example spine 656 defines solder surfaces, such as solder surfaces 662 and 664 delineated by notches 666 and 668, respectively. While the example spine 656 defines solder surfaces, in some cases the solder surfaces are not soldered to the underling circuit board.

The antenna 602 shown and discussed in FIGS. 6A and 6B is an example of an ultra-wide band (UWB) antenna designed and constructed to operate within a range of frequencies, such as between 6.24 GHz and 8.74 GHZ (e.g., channels 5, 6, 8, 9, and 10).

Figure 7A:
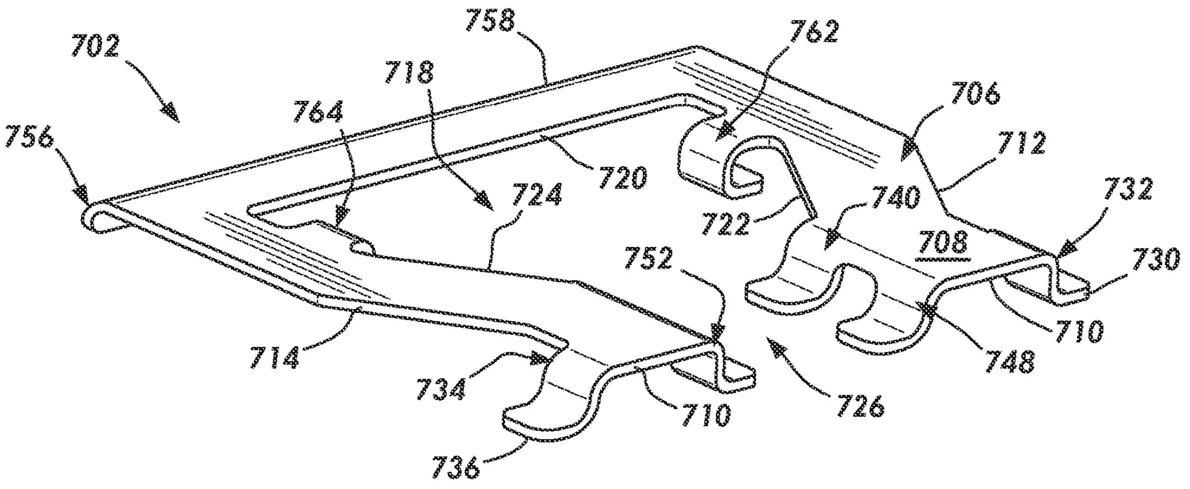
FIG. 7A shows a top perspective view of an alternate antenna.
Figure 7B:
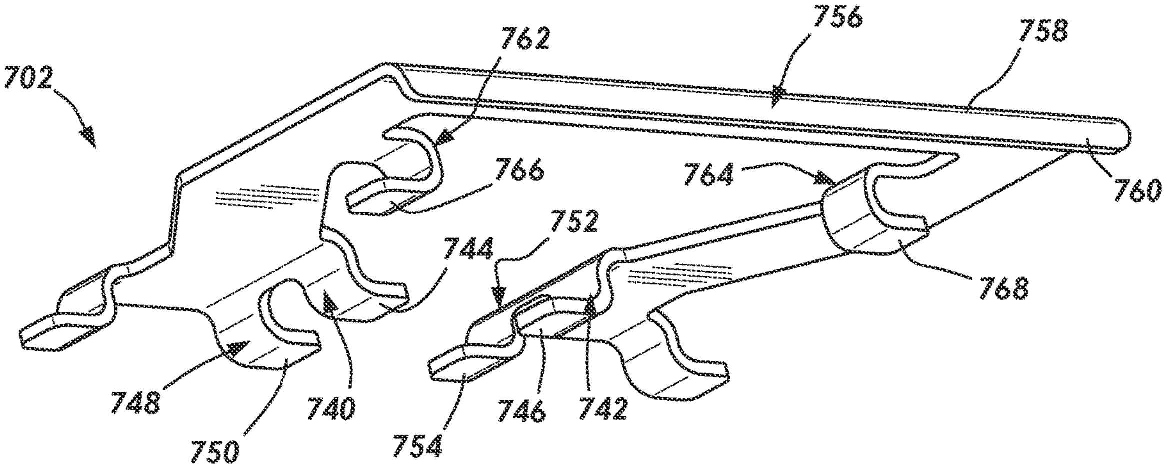
FIG. 7B shows a bottom perspective view of the alternate antenna, in accordance with at least some embodiments.

FIG. 7A shows a top perspective view of another example antenna 702, and FIG. 7B shows a bottom perspective view of the example antenna 702. Referring simultaneously to FIGS. 7A and 7B. The example antenna 702 comprises a sheet of metallic material 706 that defines a top edge 710, a left edge 712 that intersects the top edge 710, and a right edge 714 that intersects the top edge 710. The outer surface 708 defines and resides in a main plane. The antenna 702 includes the triangular notch 718. The triangular notch 718 defines a base 720, a leg 722 that intersect the base 720, a leg 724 that intersects the base 720, and an apex region 726 open on the top edge 710.

The example antenna 702 defines an exterior standoff 732 that extends from the left edge 712, and an exterior standoff 734 that extends from the right edge 714. The exterior standoff 732 defines a solder surface 730 at the bottom of the exterior standoff 732, and the exterior standoff 734 defines the solder surface 736 at the bottom of the exterior standoff 734. The solder surfaces 730 and 736, in the example form of solder pads or solder feet, abut or reside in an offset plane, and the offset plane has non-zero offset from the main plane. Thus, the example antenna 702 has only one exterior standoff on each edge of the antenna, proximate to the top edge 710.

The example antenna 702 further includes a feed spacer 740 extending into the triangular notch 718, and a second feed spacer 742 extending into the triangular notch 718. The feed spacer 742 is disposed opposite the feed spacer 740. The feed spacer 740 defines a baseplate 744 that abuts or resides in the offset plane. Similarly, the feed spacer 742 defines a baseplate 746 that abuts or resides in the offset plane.

The example antenna 702 further includes a crossover spacer 748 that extends from the apex region 726 into the triangular notch 718, the crossover spacer 748 has a baseplate 750 that abuts or resides in the offset plane. The example antenna 702 further includes a crossover spacer 752 that extends from the apex region 726 into the triangular notch 718, and the crossover spacer 752 has a baseplate 754 that abuts or resides in the offset plane. The baseplates 750 and 754 are shown in the example form of solder pads or solder feet. As before, the offset plane has non-zero offset from the main plane. The crossover spacer 652 is disposed opposite the crossover spacer 648.

The example antenna 702 further includes a spine 756 proximate to the base 720. In the example antenna 702, the spine 756 defines the lower edge 758 of the sheet of metallic material 706. The example spine 756 defines a curved portion and a planar portion 760, where the planar portion 660 defines a plane that, in some cases, is perpendicular to the main plane defined by the outer surface 708. The example spine 756 extends only partially to the offset plane. Stated otherwise, the example spine 756 does not intersect the offset plane.

The example antenna 702 further includes a set of interior standoffs 762 and 764. The interior standoff 762 extends from the leg 722 into the triangular notch 718. The interior standoff 762 defines a baseplate 766 that abuts or resides in the offset plane. The example baseplate 766 protrudes toward the edge 712 of the sheet of metallic material 706. Similarly, the interior standoff 764 extends from the leg 724 into the triangular notch 718. The interior standoff 764 defines a baseplate 768 that abuts or resides in the offset plane. The example baseplate 768 for the interior standoff 764 protrudes toward the edge 714 of the sheet of metallic material 706.

The antenna 702 shown and discussed in FIGS. 7A and 7B is an example of a Bluetooth antenna designed and constructed to operate within a range of frequencies, such as between 2.4 GHz and 2.5 GHZ.

Any or all of the example antennas may be coupled to an underlying circuit board 100. The solder pad positions, and the location and size of the recess in the ground plane, is designed for each specific antenna. All the example antennas are designed and constructed to align with an outer edge of the circuit board. Stated otherwise, the top edge of each antenna is placed within 2.0 mm of an outer edge of the circuit board, in some cases within 1.0 mm of the outer edge, and in a particular case within 0.5 mm of the outer edge if the circuit board 100.

Much like the antenna 102, the example antennas 602 and 702 may be constructed using a metal stamping and bending process. Moreover, the antennas 602 and 702 may be made of the same or similar material as antenna 102. Any of all the antennas discussed may be provided on a roll of substrate material with the outer surfaces of the antennas adhered to the substrate. Thus, the antennas may be picked from the rolls and placed on a circuit board using any available robotic pick and place system.

The offset plane may be defined by either: an outer surface of the circuit board 100; or when considering an antenna alone, the lower surfaces of the standoffs and/or feed spacers.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An antenna comprising:

a sheet of metallic material that defines an outer surface, a top edge, a first edge that intersects the top edge, and a second edge that intersects the top edge, the outer surface defines and resides in a main plane;

a notch in the sheet of metallic material, the notch is triangular and defines a base, a first leg that intersects the base, a second leg that intersects the base, and an apex region open on the top edge of the sheet of metallic material;

a first exterior standoff that extends from the first edge, the first exterior standoff has a solder surface that defines an offset plane, the offset plane having non-zero offset from the main plane;

a second exterior standoff that extends from the second edge, the second exterior standoff has a solder surface that resides in the offset plane;

a first feed spacer extending into the notch, the first feed spacer has a first baseplate that resides in the offset plane;

a first crossover spacer that extends from the first leg into the notch, the first crossover spacer has a second baseplate that resides in the offset plane; and a second crossover spacer that extends from the second leg into the notch opposite the first crossover spacer, the second crossover spacer has a third baseplate that resides in the offset plane.

2. The antenna of claim 1 further comprising a spine proximate to the base of the notch, the spine extends toward the offset plane.

3. The antenna of claim 2 wherein the spine defines a spine plane perpendicular to the main plane.

4. The antenna of claim 3 wherein a distal end of the spine plane does not intersect the offset plane.

5. The antenna of claim 2 wherein the spine extends from the base or a bottom edge of the sheet of metallic material, the bottom edge opposite the top edge.

6. The antenna of claim 2 wherein the spine extends from a bottom edge of the sheet of metallic material, and the spine defines a solder surface that resides in the offset plane.

7. The antenna of claim 6 wherein spine defines two solder surfaces disposed at opposite ends of the spine.

8. The antenna of claim 1 further comprising:

a first interior standoff that extends from the first leg into the notch, the first interior standoff defines a baseplate that resides in the offset plane; and a second interior standoff that extends from the second leg into the notch, the second interior standoff defines a baseplate that resides in the offset plane.

9. The antenna of claim 8 wherein the baseplate of the first interior standoff protrudes toward the first edge.

10. The antenna of claim 8 wherein the baseplate of the second interior standoff protrudes toward the second edge.

11. The antenna of claim 1 wherein the offset between the main plane and the offset plane is between 0.3 millimeters (mm) to 1.5 mm, inclusive.

12. The antenna of claim 1 wherein the offset between the main plane and the offset plane is about between 0.3 millimeters (mm) and 1.0 mm, inclusive.

13. The antenna of claim 1 wherein the solder surface of the first exterior standoff comprises two solder feet spaced apart from each other along the first edge.

14. The antenna of claim 13 wherein the solder surface of the second exterior standoff comprises two solder feet spaced apart from each other along the second edge.

15. The antenna of claim 1 further comprising a second feed spacer extending from the second leg of the notch opposite the first feed spacer, the second feed spacer has a baseplate that resides in the offset plane.

16. A circuit board comprising:

a board edge defined by the circuit board;

a metallic ground plane defined on or within the circuit board;

a recess within the metallic ground plane, the recess defines an interior periphery and an opening to the board edge;

a feed line that extends into the recess;

an antenna coupled to the circuit board, the antenna comprising:

a sheet of metallic material that defines an outer surface, a top edge, a first edge that intersects the top edge, and a second edge that intersects the top edge, the outer surface defines and resides in a main plane and having an offset from the circuit board that is non-zero;

a notch in the sheet of metallic material, the notch residing at least partially over the recess, the notch is triangular and defines a base, a first leg that intersect the base, a second leg that intersects the base, and an apex region that opens to the board edge;

a first exterior standoff that extends from the first edge and is electrically coupled to the metallic ground plane;

a second exterior standoff that extends from the second edge and is electrically coupled to the metallic ground plane;

a first feed spacer that extends from the first leg of the notch and is electrically coupled to the feed line by way of a reactive network;

a first crossover spacer that extends into the notch and is electrically coupled to the metallic ground plane on a first side of the opening;

a second crossover spacer that extends into the notch, the second crossover spacer is electrically coupled to the metallic ground plane on a second side of the opening; and a first reactive network disposed within the recess, the first reactive network electrically coupled between the first crossover spacer to the second crossover spacer.

17. The circuit board of claim 16 wherein the antenna further comprises a spine proximate to the base of the notch, the spine extends toward the circuit board.

18. The circuit board of claim 17 wherein the spine defines a spine plane perpendicular to the main plane.

19. The circuit board of claim 18 wherein a distal end of the spine plane does not intersect the circuit board.

20. The circuit board of claim 17 wherein the spine extends from the base or a bottom edge of the main sheet, the bottom edge opposite the top edge.

21. The circuit board of claim 17 wherein the spine extends from a bottom side of the main sheet, and the spine defines a solder surface electrically coupled to the metallic ground plane.

22. The circuit board of claim 21 wherein the spine defines two solder surfaces disposed at opposite ends of the spine, each solder surface electrically coupled to the metallic ground plane.

23. The circuit board of claim 16 wherein the antenna further comprises:

a first interior standoff that extends from the first leg into the notch, the first interior standoff defines a baseplate coupled to the circuit board; and a second interior standoff that extends from the second leg into the notch, the second interior standoff defines a baseplate that coupled to the circuit board.

24. The circuit board of claim 23 wherein the baseplate of the first interior standoff protrudes toward the first edge.

25. The circuit board of claim 23 wherein the baseplate of the second interior standoff protrudes toward the second edge.

26. The circuit board of claim 16 wherein the offset between the main plane and circuit board is between and including 0.3 millimeters (mm) to 1.5 mm, inclusive.

27. The circuit board of claim 16 wherein the offset between the main plane and the circuit board is about between 0.3 millimeters (mm) and 1.0 mm, inclusive.

28. The circuit board of claim 16 wherein a solder surface of the first exterior standoff comprises two solder feet spaced apart from each other along the first edge.

29. The circuit board of claim 28 herein a solder surface of the second exterior standoff comprises two solder feet spaced apart from each other along the second edge.

30. The circuit board of claim 16 wherein the antenna further comprises a second feed spacer extending from the second leg of the notch opposite the first feed spacer, the second feed spacer has a baseplate that abuts the circuit board within the recess.

* * * * *